United States Patent
Hasegawa

(10) Patent No.: US 12,289,429 B2
(45) Date of Patent: Apr. 29, 2025

(54) IMAGE FORMING APPARATUS HAVING A METAL SUPPORT MEMBER CONFIGURED TO SUPPORT A CONTROL BOARD AND FACE A WIRELESS COMMUNICATION BOARD

(71) Applicant: CANON KABUSHIKI KAISHA, Tokyo (JP)

(72) Inventor: Yuya Hasegawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 18/216,029

(22) Filed: Jun. 29, 2023

(65) Prior Publication Data
US 2024/0022671 A1    Jan. 18, 2024

(30) Foreign Application Priority Data

Jul. 12, 2022    (JP) ................. 2022-111681

(51) Int. Cl.
*G03G 21/16*    (2006.01)
*G03G 15/00*    (2006.01)
(Continued)

(52) U.S. Cl.
CPC ..... *H04N 1/00315* (2013.01); *G03G 15/5087* (2013.01); *G03G 15/80* (2013.01); *G03G 21/1619* (2013.01); *G03G 21/1652* (2013.01); *G03G 21/1657* (2013.01); *H04N 1/00493* (2013.01); *H04N 1/00496* (2013.01);
(Continued)

(58) Field of Classification Search
CPC .............. G03G 15/5087; G03G 15/80; G03G 21/1619; G03G 21/1652; G03G 21/1657; G03G 2221/1678; H04N 1/00315; H04N 1/00493; H04N 1/00496; H04N 2201/0049; H04N 2201/0063; H04B 1/38
See application file for complete search history.

(56) References Cited

U.S. PATENT DOCUMENTS

2004/0082309 A1* 4/2004 Smith ............... H01Q 9/32
                                                      455/344
2006/0077442 A1* 4/2006 Lum ................ G06F 21/41
                                                      358/1.15
(Continued)

FOREIGN PATENT DOCUMENTS

JP    2004-201176 A       7/2004
JP    2006056017 A  *    3/2006

*Primary Examiner* — Arlene Heredia
*Assistant Examiner* — Laura Roth
(74) *Attorney, Agent, or Firm* — Venable LLP

(57) ABSTRACT

An image forming apparatus includes a wireless communication board on which a communication circuit that wirelessly communicates image data with an external device is mounted. The wireless communication board includes a first surface to which a magnetic sheet including a magnetic layer containing metal powder is. The wireless communication board also includes an antenna provided on a second surface opposite to the first surface of the wireless communication board. The antenna is used by the communication circuit to transmit and receive wireless radio waves. A region of the magnetic sheet on the first surface and a region of the antenna on the second surface overlap with each other in a thickness direction of the wireless communication board.

13 Claims, 8 Drawing Sheets

(51) Int. Cl.
*H04B 1/38* (2015.01)
*H04N 1/00* (2006.01)

(52) U.S. Cl.
CPC ....... *G03G 2221/1678* (2013.01); *H04B 1/38* (2013.01); *H04N 2201/0049* (2013.01); *H04N 2201/0063* (2013.01)

(56) References Cited

U.S. PATENT DOCUMENTS

| | | | | |
|---|---|---|---|---|
| 2008/0012771 | A1* | 1/2008 | Watanabe | H01Q 1/22 343/700 MS |
| 2009/0289340 | A1* | 11/2009 | Yamazaki | G06K 19/07749 257/679 |
| 2013/0140371 | A1* | 6/2013 | Omura | G06K 19/07786 235/492 |
| 2014/0250495 | A1* | 9/2014 | Mahanfar | G06F 21/30 720/695 |
| 2015/0124402 | A1* | 5/2015 | Jang | B32B 27/08 148/516 |
| 2015/0181063 | A1* | 6/2015 | Ueyama | H04N 1/00559 358/1.15 |
| 2016/0064814 | A1* | 3/2016 | Jang | H05K 9/0075 174/377 |
| 2020/0389563 | A1* | 12/2020 | Toda | H04N 1/00315 |
| 2022/0214644 | A1* | 7/2022 | Toda | H04N 1/00315 |
| 2022/0321720 | A1* | 10/2022 | Mori | H04N 1/00538 |
| 2023/0031321 | A1* | 2/2023 | Hamasaki | G03G 21/1652 |
| 2024/0007569 | A1* | 1/2024 | Yasuda | H04N 1/00978 |

* cited by examiner

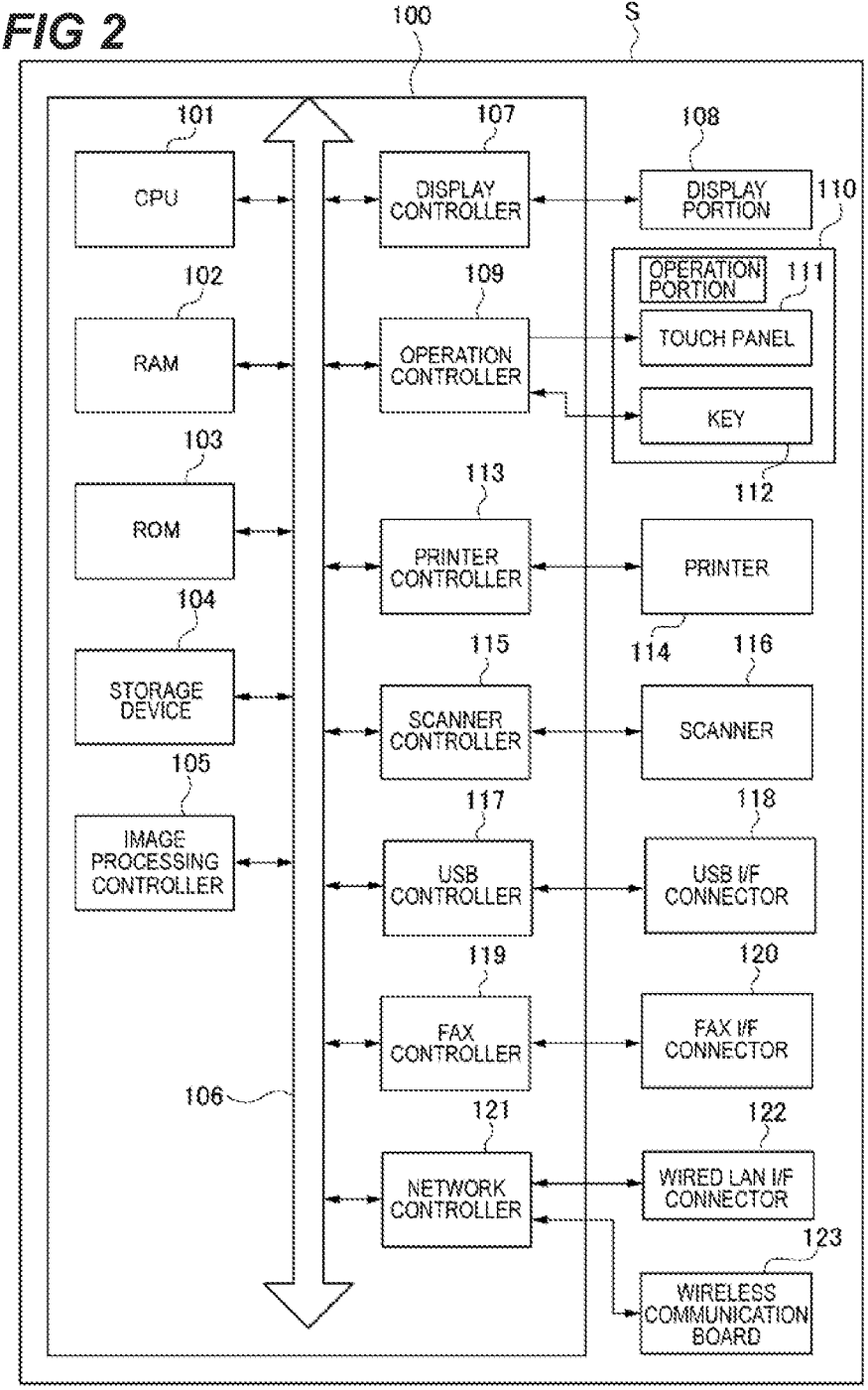

FRONT SURFACE

BACK SURFACE

FRONT SURFACE

BACK SURFACE

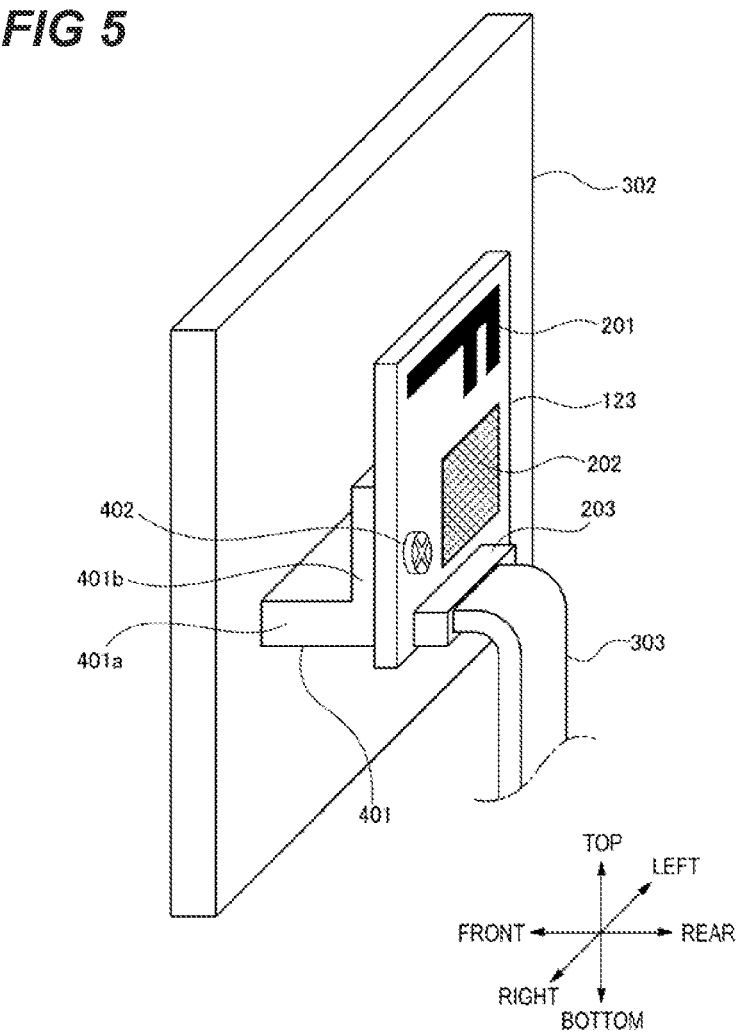

REAR SURFACE

IMAGE FORMING APPARATUS HAVING A METAL SUPPORT MEMBER CONFIGURED TO SUPPORT A CONTROL BOARD AND FACE A WIRELESS COMMUNICATION BOARD

BACKGROUND OF THE INVENTION

Field of the Invention

The present invention relates to an image forming apparatus including a wireless communication board that wirelessly communicates image data with an external device.

Description of the Related Art

An image forming apparatus includes a wireless communication board capable of long-distance wireless communication according to the IEEE 802.11 standard in order to receive image data and the like from an external terminal held by a user through a wireless network.

An electric board such as a wireless communication board or a control board for controlling the wireless communication board is fixed to a metal frame (metal housing) of the image forming apparatus, the metal frame including a plurality of sheet metals. In general, the electric board is fixed to the frame by inserting a screw into an attachment hole provided in the electric board and a screw hole provided in the frame and facing the attachment hole. The metal frame serves as a common ground (GND) potential of each electric board of the image forming apparatus. Therefore, a conductive portion (copper foil exposed portion) serving as a GND potential of the electric board is provided around the attachment hole of the electric board, and the conductive portion of the electric board is brought into contact with the screw hole of the frame by screw fastening to electrically connect the GND potential. As a result, the GND potentials of the electric boards coincide with each other by the frame of the image forming apparatus, and the electric boards stably operate.

However, on the other hand, the sheet metals included in the frame have a characteristic of reflecting waves for wireless communication and electromagnetic waves having a frequency component close thereto. Therefore, the frame for fixing the wireless communication board irradiates the wireless communication board with interference waves reflected from the surface of the frame, and sensitivity of the wireless communication may be deteriorated. In particular, the electric board operates with small energy as miniaturization of a semiconductor integrated circuit is achieved, and as a result of which high-speed operation and low power consumption operation are implemented. As an adverse effect, the electric board is likely to malfunction due to interference waves. As a result, the electric board including the wireless communication board is required to be designed to be resistant to interference waves.

Therefore, for example, in Japanese Patent Application Laid-Open No. 2004-201176, a radio wave absorbing material or a radio wave shielding material is used to prevent the wireless communication board from being irradiated with interference waves.

However, since the resistance to interference waves is reduced due to miniaturization of a semiconductor integrated circuit, it is also necessary to improve the resistance to interference waves incident on a communication antenna of the wireless communication board. The interference waves incident on the communication antenna of the wireless communication board may be reflected waves (interference waves) reflected from the metal frame, and it is necessary to consider the influence of the interference waves.

As disclosed in Japanese Patent Application Laid-Open No. 2004-201176, a method of suppressing reflection of noise radio waves by attaching the radio wave absorbing material to the entire surface of a portion of the wireless communication board that is likely to be irradiated with interference waves requires extra cost.

SUMMARY OF THE INVENTION

A representative configuration of the present invention is an image forming apparatus includes:
- a wireless communication board on which a communication circuit that wirelessly communicates image data with an external device is mounted, in which the wireless communication board has a first surface to which a magnetic sheet including a magnetic layer containing metal powder is attached, includes an antenna provided on a second surface opposite to the first surface of the wireless communication board and used for wireless communication by the communication circuit, and in which a region of the magnetic sheet on the first surface and a region of the antenna on the second surface overlap with each other in a thickness direction of the wireless communication board;
- an image forming unit configured to form an image based on the image data;
- a control board connected to the wireless communication board via a connection line and configured to control an image forming operation performed by the image forming unit; and
- a metal support member configured to support the control board, the metal support member having a metal surface that faces the first surface of the wireless communication board.

Further features of the present invention will become apparent from the following description of exemplary embodiments with reference to the attached drawings.

BRIEF DESCRIPTION OF THE DRAWINGS

FIG. 2 is a block diagram illustrating a hardware configuration of the image forming apparatus;

FIG. 5 is a view illustrating a method of attaching the wireless communication board;

DESCRIPTION OF THE EMBODIMENTS

Hereinafter, embodiments of the present invention will be exemplarily described in detail with reference to the drawings. However, the dimensions, materials, shapes, relative arrangements, and the like of the components described in the following examples should be appropriately changed depending on the configuration of the apparatus to which the present invention is applied and various conditions, and the scope of the present invention is not intended to be limited only to them.

Figure 1:
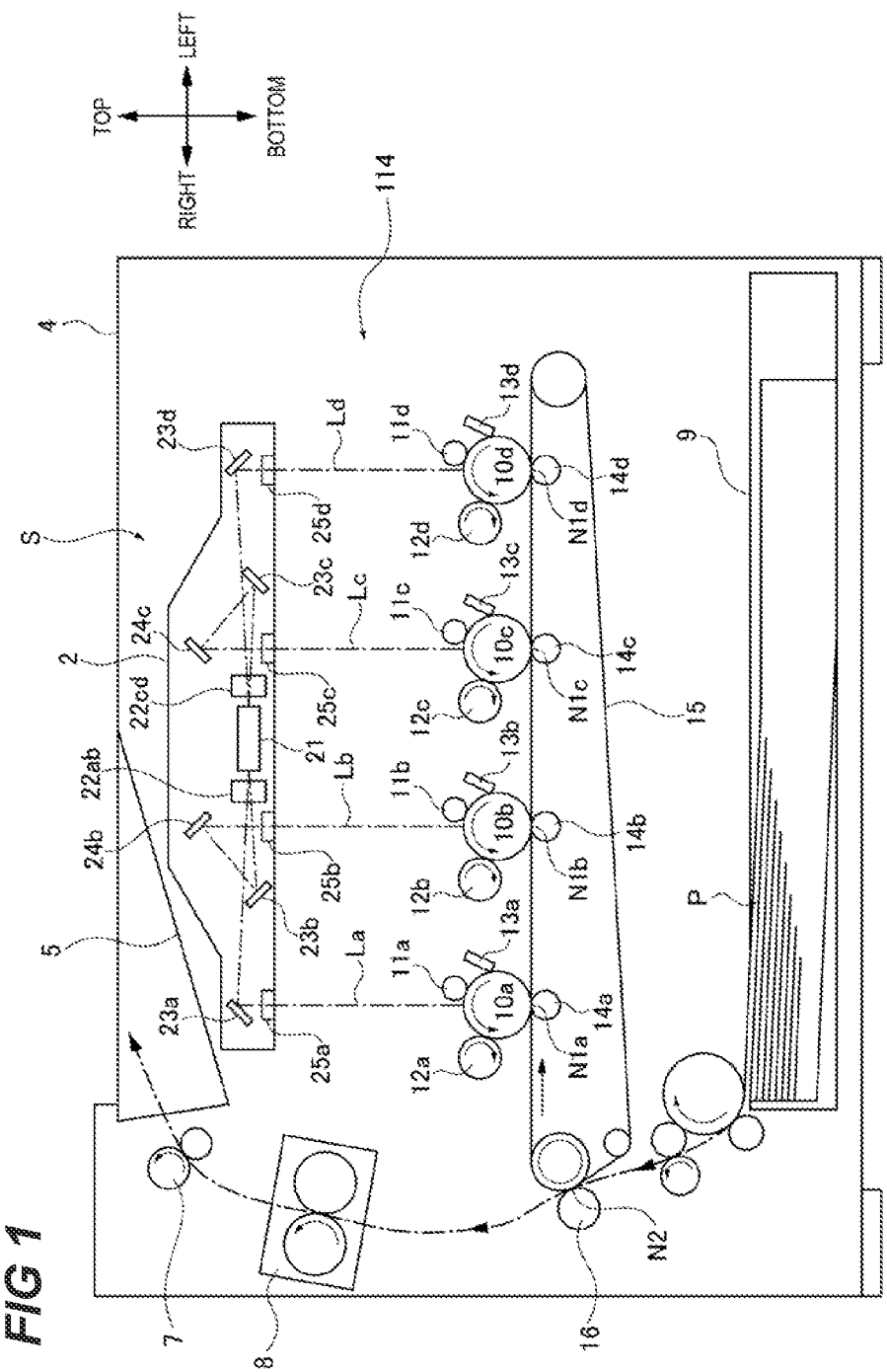
FIG. 1 is a schematic cross-sectional view illustrating a schematic configuration of an image forming apparatus.

An image forming apparatus will be described with reference to FIGS. 1 to 7. FIG. 1 is a schematic cross-sectional view illustrating a schematic configuration of the image forming apparatus, and FIGS. 4A and 4B are perspective views of the image forming apparatus.

First, the image forming apparatus will be described with reference to FIGS. 1, 4A, and 4B. Next, a hardware configuration of the image forming apparatus will be described with reference to FIG. 2. Next, a configuration around the wireless communication board in the image forming apparatus will be described with reference to FIGS. 3A to 7.

Figure 4A:
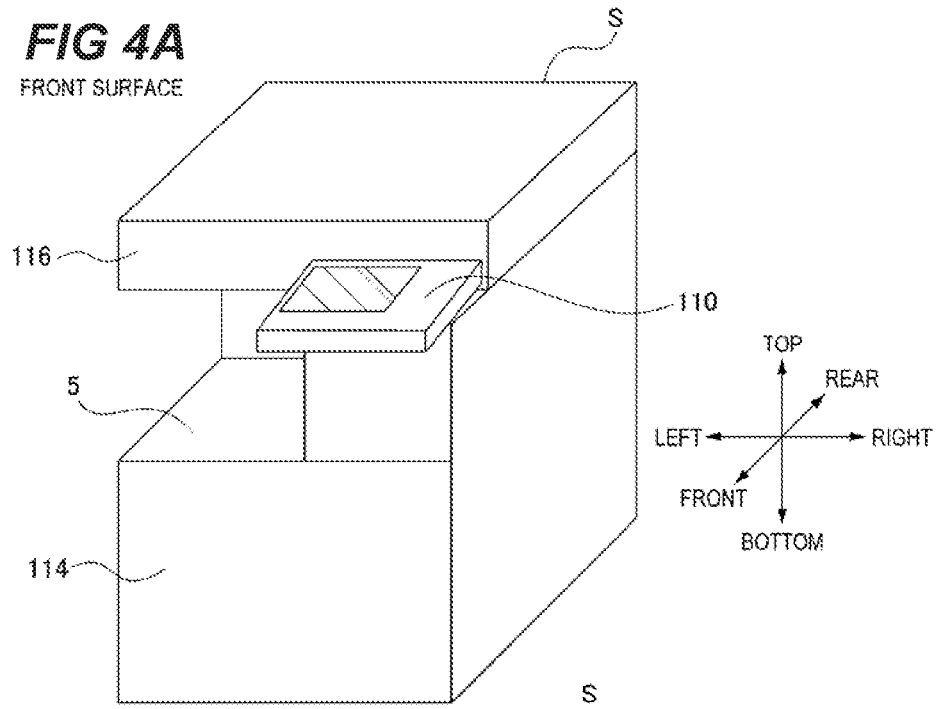
FIGS. 4A and 4B are schematic perspective views of the image forming apparatus.
Figure 4B:
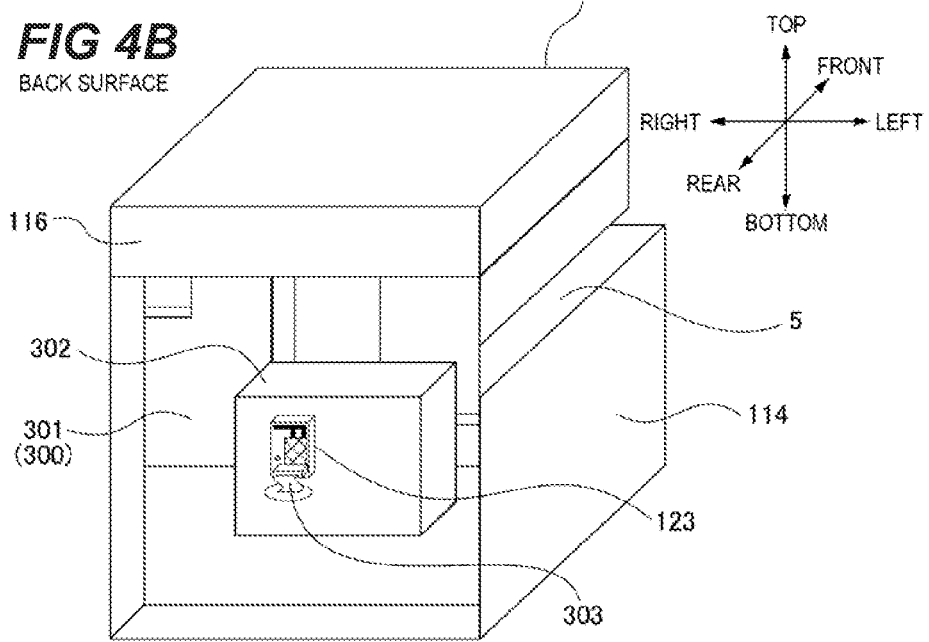

An image forming apparatus S illustrated in FIGS. 1, 4A, and 4B includes a printer 114 serving as an image forming unit that forms an image on a sheet-like recording material P such as a paper sheet or an overhead projector (OHP) film based on image data. The image forming apparatus S includes a scanner 116 serving as an image reading portion that reads an image of an original. The scanner 116 is disposed on a vertically upper side of the printer 114 via a discharge tray 5 that ejects the recording material P. In FIG. 1, the printer 114 is illustrated, but the scanner 116 is not illustrated.

The image forming apparatus S includes an operation portion 110 on a front side in a front-rear direction. The operation portion 110 displays information based on the image data and detects an operation from a user. Here, a touch panel type display including a touch panel 111 that detects a touch operation from the user or a key 112 such as a reset key is illustrated as the operation portion 110. The user can input user instruction information regarding image formation such as the number of recording materials to be output and size setting by touching a key displayed on the display with a finger. The operation portion 110 functions as a reception unit that receives the user instruction information.

An intermediate tandem type image forming apparatus in which four color toner images of yellow (Y), magenta (M), cyan (C), and black (K) are transferred to an intermediate transfer belt and then transferred to a recording material to form an image is illustrated as the image forming apparatus S. In the following description, although members using the toners of the respective colors of yellow (Y), magenta (M), cyan (C), and black (K) are given suffixes of a, b, c, and d in this order, configurations or operations of the respective members are substantially the same as each other except that the color of the toner used is different, and thus the suffixes are omitted as appropriate unless necessary to distinguish the members from each other.

Hereinafter, a configuration of the printer (image forming unit) 114 will be described. The printer 114 includes a drum type electrophotographic photosensitive member (hereinafter, referred to as "photosensitive drum") 10 (10a to 10d) for each color. The photosensitive drum 10 is rotatably supported by the image forming apparatus S, and is rotated in an arrow direction in the drawing by a driving portion (not illustrated). The photosensitive drum 10 may be a photosensitive belt.

The following process portions are arranged around the photosensitive drum 10 in a rotation direction thereof. A charging roller 11 (11a to 11d) serving as a charging portion charges the surface of the photosensitive drum 10. An exposure unit 2 serving as an exposure portion irradiates the photosensitive drum 10 with a laser beam L (La to Ld) based on image information to perform exposure. As a result, an electrostatic latent image is formed on the surface of the photosensitive drum 10. A developing roller 12 (12a to 12d) serving as a developing portion develops the electrostatic latent image formed on the surface of the photosensitive drum 10 with the toner. The developing rollers 12a to 12d attach the toners of different colors (yellow, magenta, cyan, and black) to the photosensitive drums 10a to 10d, respectively. A cleaning blade 13 (13a to 13d) serving as a cleaning portion removes the toner remaining on the surface of the photosensitive drum 10 after the toner image is transferred from the photosensitive drum 10 to an intermediate transfer belt 15.

The printer 114 includes the intermediate transfer belt (intermediate transfer member) 15 to which the toner image formed on the photosensitive drum 10 is transferred, and a primary transfer roller 14 (14a to 14d) serving as a transfer portion that sequentially transfers the toner image formed on the photosensitive drum 10 to the intermediate transfer belt 15.

The photosensitive drum 10 is formed by providing a photoconductive layer such as an organic photoconductor (OPC) on an outer peripheral surface of an aluminum cylinder. The charging roller 11 includes a core metal and a conductive elastic member surrounding the periphery of the core metal, is in contact with the surface of the photosensitive drum 10 to be driven to rotate, and is applied with a charging bias by a power supply (not illustrated).

The exposure unit 2 accommodates a rotating polygon mirror 21 that deflects and scans a laser beam emitted from a semiconductor laser (not illustrated) which is a laser light source, a first imaging optical element 22 (22ab and 22cd) that guides the laser beam deflected and scanned by the rotating polygon mirror 21 to each of the corresponding photosensitive drums 10a to 10d to form an image, reflection mirrors 23 (23a, 23b, 23c, and 23d) and 24 (24b and 24c), and a second imaging optical element 25 (25a, 25b. 25c, and 25d). The exposure unit 2 irradiates the surfaces of the charged photosensitive drums 10a to 10d with the laser beams La to Ld based on the image information to form the electrostatic latent images. The developing roller 12 attaches the toner to the electrostatic latent image on the surface of the photosensitive drum 10 to develop the electrostatic latent image, thereby forming a toner image on the surface of the photosensitive drum 10.

The intermediate transfer belt 15 is a belt formed in an endless shape in such a way as to form a ring, and is stretched around three stretching rollers parallel to each other. When the stretching rollers rotate, the intermediate transfer belt 15 is driven in such a way that the surface of the intermediate transfer belt 15 moves in an arrow direction. The primary transfer roller 14 (14a to 14d) is disposed inside the ring of the intermediate transfer belt 15, and presses the intermediate transfer belt 15 against the surface of the photosensitive drum 10 to form a primary transfer nip portion N1 (N1a to N1d) between the photosensitive drum 10 and the intermediate transfer belt 15. A primary transfer bias is applied to the primary transfer roller 14 by the power supply (not illustrated). The secondary transfer roller 16 is disposed downstream of the primary transfer nip portion N1 (N1a to N1d) in a driving direction of the intermediate transfer belt 15, and a secondary transfer nip portion N2 is formed between the secondary transfer roller 16 and the intermediate transfer belt 15. A secondary transfer bias is applied to the secondary transfer roller 16 by the power supply (not illustrated).

A feeding portion 9 feeds the recording material P to the secondary transfer nip portion N2, and can store a plurality of recording materials P.

A fixing device 8 that heats and pressurizes the recording material P to fix the toner on the recording material P is provided downstream of the secondary transfer nip portion N2 in a transport direction of the recording material P (a direction indicated by a broken line arrow). A discharge roller 7 for discharging the recording material P to the outside of the image forming apparatus S is provided downstream of the fixing device 8 in the transport direction.

The configuration described above functions as the printer (image forming unit) 114 that forms an image on the recording material P. Although not illustrated, the printers 114 are supported by a frame serving as a support member including a plurality of sheet metals. Specifically, the printer 114 is disposed between a rear plate 301 and a front plate (not illustrated) included in the frame, and the frame is covered with a cover 4 serving as an exterior member and the discharge tray 5 serving as a discharge stacking portion provided on an upper surface portion of the cover 4.

The printer (image forming unit) 114 is supported by a metal frame (metal housing) 300 including a plurality of sheet metals. The rear plate 301 is provided on a rear side of the image forming apparatus S and is formed of the sheet metal. The rear plate 301 is a part of the frame 300 on a back side of the image forming apparatus S. Although not illustrated, the front plate is provided on a front side of the image forming apparatus S and is formed of the sheet metal. The front plate is a part of the frame 300 on the front side of the image forming apparatus S.

The rear plate 301 and the front plate are arranged to face each other, and the sheet metal (not illustrated) serving as a beam (stay) is bridged between the rear plate 301 and the front plate. The rear plate 301, the front plate, and the beam (not illustrated) are a part of the frame 300 for the image forming apparatus S.

The scanner 116 is disposed on the vertically upper side of the printer 114 via the discharge tray 5, and is disposed on a vertically upper side of the frame 300. The operation portion 110 is disposed on a vertically upper side of a metal columnar support 304 that is apart of the frame 300. The operation portion 110 is disposed on the front side in the front-rear direction and is disposed on the front side of the scanner 116.

Figure 8:
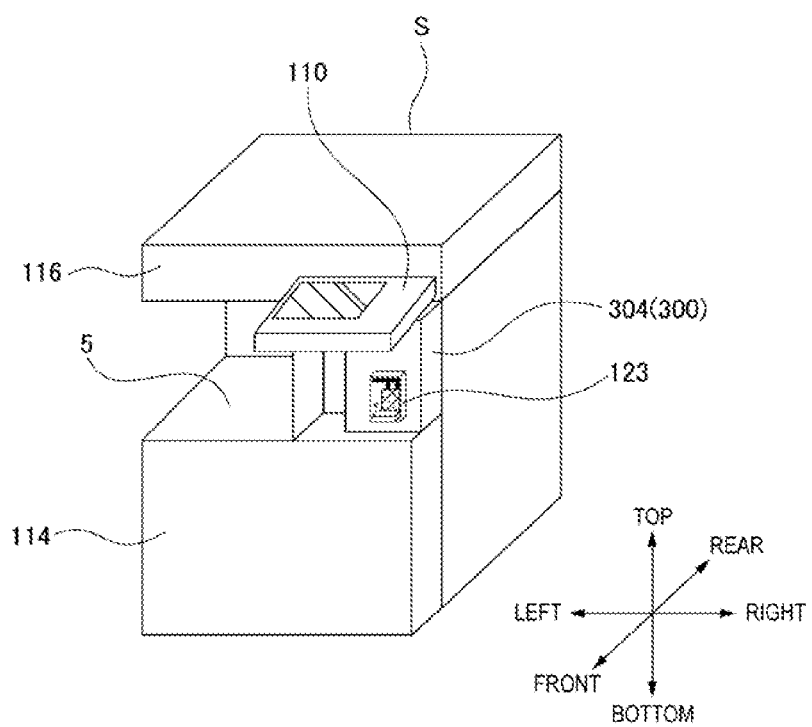
FIG. 8 is a schematic view illustrating arrangement in a case where the wireless communication board is disposed on a front surface of the image forming apparatus.

Here, as illustrated in FIGS. 4A and 4B, in the following description, a front plate side is defined as the front side, and a rear plate 301 side is defined as the rear side (or the back side) in the image forming apparatus. When the photosensitive drum 10d on which the electrostatic latent image related to the black toner image is formed is used as a reference, a side on which the photosensitive drum 10a on which the electrostatic latent image related to the yellow toner image is formed is disposed is defined as a right side. When the photosensitive drum 10a on which the electrostatic latent image related to the yellow toner image is formed is used as a reference, a side on which the photosensitive drum 10d on which the electrostatic latent image related to the black toner image is formed is disposed is defined as a left side. Furthermore, a top direction in the vertical direction that is perpendicular to the front-rear direction and a left-right direction defined here is defined as a top direction, and a bottom direction in the vertical direction that is perpendicular to the front-rear direction and the left-right direction defined here is defined as a bottom direction. The defined front direction, rear direction, right direction, left direction, top direction, and bottom direction are illustrated in FIGS. 1, 4, 8, and the like.

A controller box 302 in which a controller 100 serving as a control board is accommodated is attached to the rear plate 301. The controller box 302 is a metal housing for suppressing external noise from propagating to the controller 100. The controller box 302 functions as a metal accommodating portion that accommodates the controller 100 serving as the control board therein. A control signal for each unit is transmitted to the controller 100 via a bundle line (connection line). Therefore, the controller box 302 includes a support portion that supports the bundle line (connection line). The controller 100 acquires image data received by the wireless communication board 123 through wireless communication via a communication cable 303, and controls an image forming operation performed by the printer (image forming unit) 114 in order to form an image on the recording material P based on the acquired image data. However, the wireless communication scheme for the configuration can be any scheme such as Wi-Fi. Bluetooth Low Energy (BLE), or near-field communication (NFC).

Next, the image forming operation performed by the image forming apparatus S will be described. The photosensitive drum 10 is rotated in the arrow direction in FIG. 1, a toner image is formed on the surface of the photosensitive drum 10 through the following processes.

First, the surface of the photosensitive drum 10 is charged by the charging roller 11 to which the charging bias is applied, and has a predetermined potential. Thereafter, the exposure unit 2 irradiates the photosensitive drum 10 with the laser beam L by a video signal which is image information from the control board 31, and an electrostatic latent image is formed on the surface of the photosensitive drum 10. In the electrostatic latent image formed on the surface of the photosensitive drum 10, the toner is attached to a portion irradiated with the laser beam at a position facing the developing roller (a position abutting on the developing roller 12), so that the toner image obtained by developing the electrostatic latent image appears. By performing such an operation on each photosensitive drum 10, toner images of different colors (yellow, magenta, cyan, and black) are formed on the photosensitive drums 10, respectively.

Then, the toner image on the photosensitive drum 10 is transferred to the intermediate transfer belt 15 at the primary transfer nip portion N1 by an action of the primary transfer bias applied to the primary transfer roller 14. In addition, the toner images on the photosensitive drums 10 are transferred to the intermediate transfer belt 15 at timings at which the toner images overlap one another. Therefore, a four color toner image in which the yellow, magenta, cyan, and black toner images overlap one another is formed on the intermediate transfer belt 15. The toner remaining on the photosensitive drum 10 after passing through the primary transfer nip portion N1 is scraped off by the cleaning blade 13.

The toner image on the intermediate transfer belt 15 is transported to the secondary transfer nip portion N2 by the rotation of the intermediate transfer belt 15. Further, the recording material P is transported to the secondary transfer nip portion N2 according to a timing at which the toner image on the intermediate transfer belt 15 is transported to the secondary transfer nip portion N2. The toner image on the intermediate transfer belt 15 is transferred to the recording material P at the secondary transfer nip portion N2 by an action of the secondary transfer bias applied to the secondary transfer roller 16.

The recording material P to which the toner image has been transferred is transported to the fixing device 8, and is heated and pressurized in the fixing device 8, and the toner image is fixed (fused) to the recording material P. As a result, a color image of four colors is formed on the recording material P. The toner remaining on the surface of the intermediate transfer belt 15 after passing through the secondary transfer nip portion N2 is scraped off by a belt cleaner (not illustrated).

The recording material P having passed through the fixing device 8 is discharged to the outside of a main body of the image forming apparatus S by the discharge roller 7, and is stacked on the discharge tray 5 serving as the discharge stacking portion provided on the upper surface portion of the cover 4. The image forming operation performed by the image forming apparatus S has been described above.

Next, a hardware configuration of the image forming apparatus S will be described with reference to FIG. 2. FIG. 2 is a block diagram illustrating the hardware configuration of the image forming apparatus S.

The image forming apparatus S includes the controller 100, a display portion 108, the operation portion 110, the printer 114, the scanner 116, a USB I/F connector 118, a FAX I/F connector 120, a wired LAN I/F connector 122, and the wireless communication board 123.

The controller 100 includes a central processing unit (CPU) 101, a random access memory (RAM) 102, a read-only memory (ROM) 103, a storage device 104, an image processing controller 105, a system bus 106, a display controller 107, an operation controller 109, a printer controller 113, a scanner controller 115, a USB controller 117, a FAX controller 119, and a network controller 121. The operation portion 110 includes the touch panel 111 and the key 112.

The CPU 101 is a central processing unit that controls the entire image forming apparatus S, and is connected to each portion through the system bus 106. The RAM 102 is a work memory for the CPU 101 to operate, and is used for importing various programs, storing arithmetic processing results, and storing image data processed by the image processing controller 105 by operations such as printing and scanning. The ROM 103 is a memory that stores a startup program of the CPU 101, various setting information, and the like.

The storage device 104 is a NAND nonvolatile memory (flash memory) for storing large-sized programs and data, and is an embedded multi-media card (eMMC) in the present embodiment. However, the nonvolatile memory is not limited to the eMMC, and may be a solid state drive (SSD) or another nonvolatile memory device.

The image processing controller 105 executes image processing such as conversion of an original read by the scanner 116 into image data, and conversion into image data to be printed by the printer 114, such as enlargement, size reduction, and monochrome.

The display controller 107 transmits image data to the display portion 108 according to a communication protocol of the display portion 108. The operation controller 109 receives an input from the touch panel 111 and the key 112 and converts the input into data that can be understood by the CPU 101.

The printer controller 113 controls various devices such as a photosensitive drum, a laser oscillator, and a toner fixing device related to a printing operation of the printer 114 when printing image data designated by the CPU 101. The scanner controller 115 controls various devices such as an original detection sensor and a reading sensor related to a reading operation of the scanner 116.

The USB controller 117 connects the USB I/F connector 118 and an external terminal (not illustrated) via a USB cable, and performs communication of image data and the like. The FAX controller 119 connects the FAX I/F connector 120 and a public line network via a telephone line, and performs communication of image data and the like.

The network controller 121 connects the wired LAN I/F connector 122 and an external terminal via a LAN cable to perform network communication. In addition, the network controller 121 controls the wireless communication board 123 to transmit and receive data to and from an external terminal and perform network communication using a wireless communication standard according to a wireless LAN standard such as IEEE 802.11. In the present embodiment, the wireless communication board 123 can perform wireless communication according to a standard compliant with IEEE 802.11.

Next, a configuration around the wireless communication board in the image forming apparatus S will be described with reference to FIGS. 3A to 7.

Figure 3A:
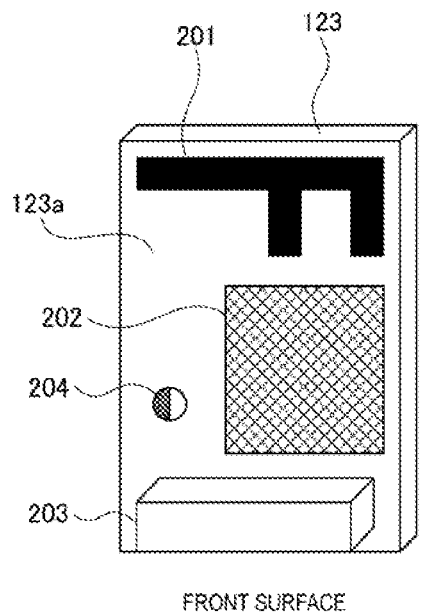
FIGS. 3A and 3B are schematic perspective views of a wireless communication board.
Figure 3B:
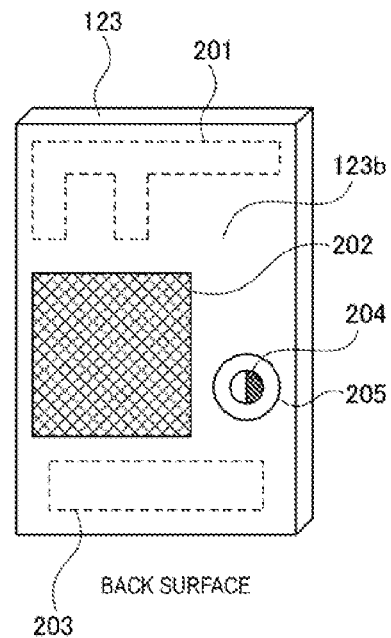

First, the configuration of the wireless communication board 123 will be described with reference to FIGS. 3A and 3B. FIGS. 3A and 3B are schematic perspective views of the wireless communication board.

The image forming apparatus S includes the wireless communication board 123 illustrated in FIGS. 3A and 3B. A communication circuit (wireless communication driver circuit 202) that wirelessly communicates image data with an external device is mounted on the wireless communication board 123. The wireless communication board 123 is, for example, a board in which a metal pattern is formed by using a plurality of layers of copper foils on a base material obtained by impregnating a glass cloth with an epoxy resin, and on which electronic components are mounted by soldering. However, the base material may be manufactured using materials other than the materials described above, and the components to be mounted are not limited.

In the present embodiment, the wireless communication board 123 includes a wireless communication antenna 201, the wireless communication driver circuit 202, a controller communication connector 203, an attachment hole 204, and a copper foil exposed portion 205.

The wireless communication antenna 201 is a pattern antenna formed using the metal pattern on the surface of the wireless communication board 123, and is used for transmission and reception of wireless radio waves. The wireless communication antenna 201 is provided on a front surface (second surface) 123a opposite to a back surface (first surface) 123b facing the rear plate 301 in a thickness direction of the wireless communication board 123. The rear plate 301 is formed of the sheet metal as described above, and is provided on the rear side of the image forming apparatus S. The rear plate 301 is a part of the frame (metal housing) 300 on the back side of the image forming apparatus S.

The wireless communication driver circuit 202 functions as a communication circuit that wirelessly communicates image data with an external device. The wireless communication driver circuit 202 performs conversion of data for performing network communication between the controller 100 and the external terminal, outputs an electric signal to the wireless communication antenna 201, or processes an electric signal received by the wireless communication antenna 201. In a case where data is transmitted from the controller 100 to the external terminal, data to be transmitted generated by the controller 100 is converted into a signal format according to a wireless communication standard and output to the wireless communication antenna 201 as an electric signal. In a case where data is received from the external terminal to the controller 100, an electric signal received by the wireless communication antenna 201 is decoded into communication data by a method according to a wireless communication standard and is transmitted to the controller 100. The wireless communication driver circuit 202 includes components mounted on the front surface 123a and the back surface 123b of the wireless communication board 123, but the surfaces on which the components are mounted are not limited, and a metal pattern for connecting the components may be formed anywhere on the front surface 123a and the back surface 123b of the wireless communication board 123 and an inner layer.

The controller communication connector 203 is an I/F connector used for wired connection for communicating data transmitted and received by the wireless communication board 123 between the network controller 121 and the wireless communication driver circuit 202. In other words, the controller communication connector 203 is a connector for connecting the communication cable 303, which is a connection line for wired connection of the controller 100. The controller communication connector 203 is mounted on the same surface (the front surface 123a in this case) as the wireless communication antenna 201 of the wireless communication board 123.

The attachment hole 204 and the copper foil exposed portion 205 are used when attaching the wireless communication board 123 to the image forming apparatus S. The attachment hole 204 is used to define the position of a screw when attaching the wireless communication board 123 to the image forming apparatus S by screw fastening. The attachment hole 204 penetrates from the front surface 123a to the back surface 123b of the wireless communication board 123. In the present embodiment, the attachment hole 204 has a closed shape, but the attachment hole 204 may have a partially opened shape such as a notch. The copper foil exposed portion 205 is electrically connected to a ground (GND) potential of the wireless communication board 123 including the wireless communication driver circuit 202. The copper foil exposed portion 205 may be subjected to surface treatment such as gold plating, for example, in such a way as to have conductivity and hardly oxidize. The copper foil exposed portion 205 is provided on the back surface 123b of the wireless communication board 123, that is, the first surface facing the controller box 302 (metal surface) to be described later. The copper foil exposed portion 205 is a conductive portion that is provided around the attachment hole 204 on the back surface 123b of the wireless communication board 123 and is brought into contact with and electrically connected to an attachment portion (the controller box 302 to be described later) of the image forming apparatus S.

Here, a radio wave propagation characteristic of the wireless communication board 123 is affected by the stability of the GND potential serving as a reference potential of the wireless communication board 123, and when the GND potential is unstable, the radio wave propagation characteristic deteriorates. Examples of a method of stabilizing the GND potential of the wireless communication board 123 include a method of electrically connecting the GND potential of the wireless communication board 123 and the frame (metal housing) that serves as the GND potential of the image forming apparatus S. First, the attachment portion for attaching the wireless communication board 123 to the image forming apparatus S is electrically connected to the frame of the image forming apparatus S, or attaches a part of the frame of the image forming apparatus S to the wireless communication board. The frame of the image forming apparatus S is grounded through the power supply (not illustrated). Next, the wireless communication board 123 is screwed to the attachment portion of the image forming apparatus S through the attachment hole 204 in such a way that the attachment portion of the image forming apparatus S and the copper foil exposed portion 205 of the wireless communication board 123 are brought into contact with each other. Since the attachment portion of the image forming apparatus S and the copper foil exposed portion 205 are crimped by a screw fastening pressure, the GND potential of the wireless communication board 123 is electrically connected to the GND potential of the image forming apparatus S.

In the present embodiment, as a pressure is applied by screw fastening, the copper foil exposed portion 205 and the metal of the attachment portion of the image forming apparatus S are brought into contact with each other to secure electrical connection of the GND potential, but the method of securing electrical connection of the GND potential is not limited thereto. For example, a conductive spring, conductive grease, or the like may be provided on metal between the copper foil exposed portion 205 and the attachment portion of the image forming apparatus S to secure electrical connection of the GND potential, so that the image forming apparatus S may be attached without applying a pressure by screw fastening. Furthermore, in a case where the radio wave propagation characteristic of the wireless communication antenna 201 is sufficiently excellent, the attachment hole 204 and the copper foil exposed portion 205 do not have to be formed in the wireless communication board 123. Alternatively, when attaching the wireless communication board 123 having the attachment hole 204 and the copper foil exposed portion 205 to the image forming apparatus S, the copper foil exposed portion 205 does not have to be electrically connected to the frame of the image forming apparatus. This proposal does not limit inclusion of the attachment hole 204 and the copper foil exposed portion 205 in the configuration of the wireless communication board 123.

In the present embodiment, the attachment portion of the image forming apparatus S to which the wireless communication board 123 is attached is an attachment portion 401 (see FIG. 5) of the controller box 302 fixed to the rear plate 301 included in the frame 300. This will be described with reference to FIGS. 4A, 4B, and 5.

First, an example of a method of attaching the wireless communication board 123 to the image forming apparatus S will be described with reference to FIGS. 4A and 4B.

The image forming apparatus S includes the printer 114 serving as the image forming unit that forms an image on the recording material P, and the frame 300 that includes a plurality of sheet metals and supports the printer 114. The image forming apparatus S further includes the controller 100 serving as the control board connected to the wireless communication board 123 by the communication cable (connection line) 303, and the metal controller box 302 that is supported by the frame 300 and forms an accommodation space for accommodating the controller 100.

The controller 100 is contained in the controller box 302 and is fixed to the controller box 302 in the controller box 302. The controller box 302 is supported on and fixed to the rear plate 301 included in the frame 300 by screw fastening.

The wireless communication board 123 is disposed outside the controller box 302 and attached to the controller box 302. Therefore, in the present embodiment, the support member that supports the wireless communication board 123 is the controller box 302 fixed to the rear plate 301 included in the frame 300 of the image forming apparatus S, and the wireless communication board 123 is supported by the controller box 302. The controller box 302 has the metal surface facing the back surface (first surface) 123b of the wireless communication board 123.

Here, an example of a method of securing a stable GND potential of the controller 100 will be described. In the present embodiment, a method for covering the controller 100 with the metal controller box 302 will be described.

The controller box 302 is used for stable operation of the controller 100. In general, in the controller 100, each block connected by the system bus 106 such as the CPU 101 operates at a high speed, and a stable GND potential is required to stabilize the operation. However, the frame (metal housing) 300 of the image forming apparatus S has scattered configurations for bonding metals to each other with small contacts in order to secure a large number of components such as the photosensitive drum 10 and the intermediate transfer belt 15 included in the printer 114 and a transport path for guiding the recording material. In a case where the controller 100 is directly attached to the frame 300 bonded with such small contacts, the GND potential of the controller 100 becomes unstable, and the stable operation of the controller 100 is hindered. Therefore, as the controller box 302 is fixed and connected to the rear plate 301 included in the frame 300 by screw fastening, the GND potential of the controller 100 is stabilized without being affected by the configuration of the printer 114.

Next, the arrangement of the wireless communication board 123 will be described. The wireless communication board 123 and the controller 100 transmit and receive data by wired connection using the communication cable 303 serving as the connection line. Therefore, when a communication distance is increased, the cost of the communication cable 303 increases, and thus, it is desirable that the wireless communication board 123 and the controller 100 are as close as possible. However, when the wireless communication board 123 is disposed inside the controller box 302 like the controller 100, propagation of radio waves transmitted from the wireless communication antenna 201 of the wireless communication board 123 and radio waves to be received by the wireless communication antenna 201 deteriorates, and accuracy of wireless communication deteriorates. Therefore, the wireless communication board 123 is disposed outside the controller box 302. The communication cable 303 connected to the controller 100 is guided to the outside of the controller box 302 through a hole formed in the controller box 302, and is connected to the controller communication connector 203 of the wireless communication board 123 attached to the outside of the controller box 302.

Next, an example of a method of attaching the wireless communication board 123 to the controller box 302 will be described with reference to FIG. 5.

The wireless communication board 123 is attached to the attachment portion 401 protruding from an outer surface of the controller box 302 by using a screw 402.

The attachment portion 401 is a substantially L-shaped sheet metal having a protruding portion 401a and a seating surface 401b. The protruding portion 401a of the attachment portion 401 protrudes in a vertical direction (a direction corresponding to the front-rear direction of the image forming apparatus) from the outer surface of the controller box 302. The seating surface 401b of the attachment portion 401 extends in a horizontal direction orthogonal to the vertical direction at a position away from the outer surface of the controller box 302 by a predetermined distance, and has a shape for attaching the wireless communication board 123.

The protruding portion 401a (protruding in the vertical direction) of the attachment portion 401 protrudes from the outer surface of the controller box 302 by a predetermined distance (for example, 20 mm) to maintain a separation distance between the wireless communication antenna 201 and the controller box 302. The seating surface 401b (extending in the horizontal direction) of the attachment portion 401 overlaps with at least a partial region including the copper foil exposed portion 205, and does not overlap with the wireless communication antenna 201 when the wireless communication board 123 is attached. Since the attachment portion 401 has the same potential as the GND potential of the image forming apparatus S, when the wireless communication antenna 201 and the attachment portion 401 overlap with each other, an electrical impedance of the wireless communication antenna 201 changes and a radio wave transmission/reception characteristic deteriorates. Therefore, the seating surface 401b of the attachment portion 401 does not overlap with the wireless communication antenna 201.

In addition, in order to facilitate insertion of the screw 402, the screw 402 is inserted in a direction perpendicular to the sheet metal of the attachment portion 401. Therefore, by arranging the attachment portion 401, the controller box 302, and the wireless communication board 123 in parallel to each other as much as possible, visibility at the time of screw fastening is improved, and screw fastening is facilitated.

When the wireless communication board 123 operates, the wireless communication board 123 simultaneously receives interference waves from the outside in addition to the wireless communication radio waves. The wireless communication driver circuit 202 receives, as an analog signal, composite waves of a wireless communication signal and noise caused by interference waves from radio waves received by the wireless communication antenna 201, converts the composite waves into a digital signal, and transmits data to the controller 100. At this time, when the noise caused by the interference waves is larger than a certain reference value, a difference occurs between the analog signal received by wireless communication and the digitized signal, and a signal error occurs. The wireless communication standard including IEEE 802.11 has a correction function for certain signal errors for each standard, but when a signal error that cannot be covered by the correction function occurs due to interference waves, data communication deteriorates, and in some cases, wireless communication fails. That is, decreasing a signal level of interference waves received by the wireless communication antenna 201 leads to improvement in communication quality of wireless communication.

The interference waves incident on the wireless communication antenna 201 include electromagnetic waves reflected from a metal near the wireless communication antenna 201 in addition to electromagnetic waves directly propagating from a space. In the present embodiment, the metal near the wireless communication antenna 201 is the controller box 302 which is the metal support member that supports the wireless communication board 123. The interference waves reflected by the controller box 302 can be suppressed by disposing a member having high magnetic permeability such as a magnetic sheet on an electromagnetic wave reflection path. In other words, the interference waves can be suppressed by disposing the magnetic sheet between the controller box 302 and the wireless communication board 123.

For example, by attaching the magnetic sheet to a specific region of the controller box 302 close to the wireless communication board 123, it is possible to suppress the interference waves reflected by the controller box 302 from being incident on the wireless communication antenna 201. However, the controller box 302 often has an uneven shape in order to compensate for the strength of the sheet metal. For example, in a case where the controller box 302 has a configuration in which a lid (shield plate) covering an opening for accommodating the controller 100 in the accommodation space is attached, a portion to which the lid is attached has an attachment hole or a hole for screw fastening, and thus cannot have a flat shape. Therefore, it is difficult to accurately attach the magnetic sheet. In addition, since the unevenness of the controller box 302 eliminates the regularity of a reflection direction of the reflected interference waves, the signal level of the interference waves incident on the wireless communication antenna 201 is highly likely to decrease.

Figure 7:
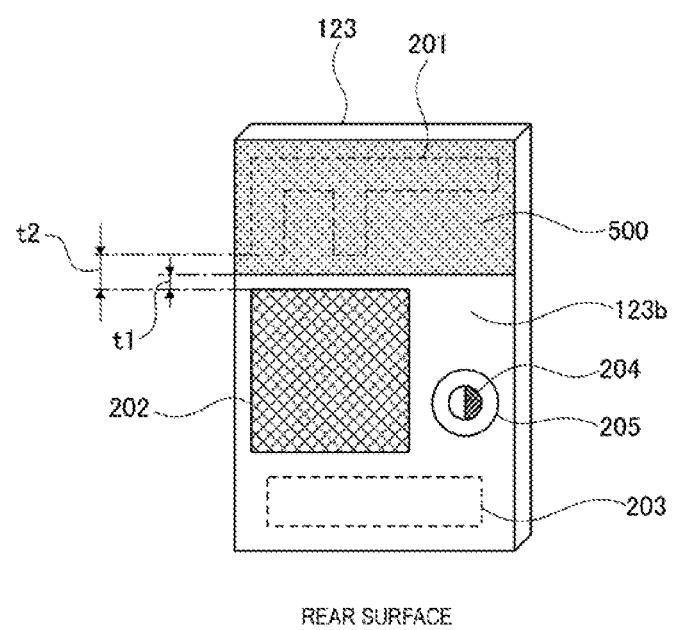
FIG. 7 is a perspective view illustrating arrangement of the magnetic sheet of the wireless communication board.

Therefore, in the present embodiment, a magnetic sheet 500 is attached to the wireless communication board 123 as illustrated in FIG. 7 in such a way that the magnetic sheet can be accurately attached to a flat region. When the magnetic sheet 500 is attached to the wireless communication board 123, the magnetic sheet 500 is attached to the first surface of the wireless communication board 123 that faces the controller box 302 (metal surface), that is, the back surface 123b of the wireless communication board 123. Accordingly, it is possible to suppress the interference waves reflected from the controller box 302 from being incident on the wireless communication antenna 201. In addition, it is possible to suppress interference waves from being incident on the wireless communication board 123 at low cost.

Figure 6:
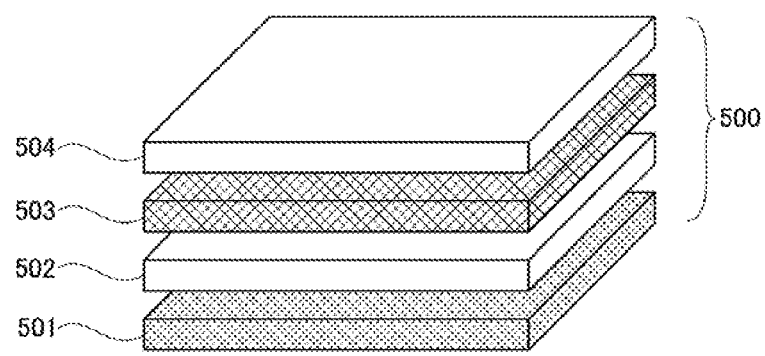
FIG. 6 is a view illustrating a layer configuration of a magnetic sheet.

Here, the structure of the magnetic sheet 500 will be described with reference to FIG. 6. FIG. 6 is a view illustrating a layer configuration of the magnetic sheet 500.

The magnetic sheet 500 includes a surface film 501, a magnetic layer 502, a double-sided adhesive tape 503, and a release liner 504. The surface film 501 is a protective layer serving to protect the magnetic layer 502, and is an insulator. The magnetic layer 502 is a conductor mainly formed of metal powder and a resin, and has a radio wave absorption principle that varies depending on the type of material used, and is classified into three types of dielectric loss, magnetic loss, and reflection loss. The double-sided adhesive tape 503 is an adhesive layer serving to fix the magnetic sheet 500 to a portion to which the magnetic sheet is attached, and is an insulator. The release liner 504 serves to protect the double-sided adhesive tape 503, and is peeled off when the magnetic sheet 500 is attached.

As the magnetic sheet 500, it is general to use a sheet obtained by cutting out a large sheet to the size of a portion to be used. At this time, depending on how the magnetic sheet 500 is cut, the cut may not be constant, and the magnetic layer 502 may be exposed. When the magnetic layer 502 comes into contact with the communication circuit in an exposed state, the communication circuit may be short-circuited.

Therefore, the magnetic sheet 500 attached to the wireless communication board 123 is arranged and attached as illustrated in FIG. 7. The arrangement of the magnetic sheet 500 attached to the wireless communication board 123 will be described with reference to FIG. 7. FIG. 7 is a perspective view illustrating arrangement of the magnetic sheet of the wireless communication board.

The magnetic sheet 500 is attached to the back surface 123b of the wireless communication board 123, that is, the first surface of the wireless communication board 123 that faces the controller box 302 (metal surface). In addition, the magnetic sheet 500 is attached to at least a region overlapping with the wireless communication antenna 201 on the back surface 123b of the wireless communication board 123 in such a way as to cover the region. In other words, the region of the magnetic sheet 500 on the first surface and the region of the wireless communication antenna 201 on the second surface overlap with each other in the thickness direction of the wireless communication board 123. As a result, the magnetic sheet 500 blocks most of paths through which interference waves reflected from the controller box 302 are incident on the wireless communication antenna 201.

The magnetic sheet 500 may be attached to a region other than the region overlapping with the wireless communication antenna 201 on the back surface 123b of the wireless communication board 123, but great care is needed for the following regions.

The magnetic sheet 500 is not attached to a region overlapping with the attachment hole 204 and the copper foil exposed portion 205 on the back surface 123b of the wireless communication board 123. In a case where the wireless communication board 123 is fixed to the controller box 302 by screw fastening, it is desirable that the magnetic sheet 500 is not attached to the region overlapping with the attachment hole 204 and the copper foil exposed portion 205. In a case where the magnetic sheet 500 is attached in such a way as to overlap with the attachment hole 204, the screw does not pass through the attachment hole 204, and the wireless communication board 123 cannot be screwed to the attachment portion. The copper foil exposed portion 205 comes into contact with the attachment portion 401 of the controller box 302 to electrically connect the GND potential. Therefore, in a case where the magnetic sheet 500 is attached in such a way as to overlap with the copper foil exposed portion 205 to insulate the copper foil exposed portion 205, the stable operation of the wireless communication board 123 may be impaired. Therefore, the magnetic sheet 500 is attached in such a way as not to overlap with the attachment hole 204 and the copper foil exposed portion 205 on the back surface 123b of the wireless communication board 123. For example, the magnetic sheet 500 may be overlappingly attached to a part of the wireless communication driver circuit 202 in such a way as not to overlap with the copper foil exposed portion 205 on the back surface 123b. In other words, the magnetic sheet 500 may be attached to a region other than the region overlapping with the attachment hole 204 or the copper foil exposed portion 205 on the back surface 123b of the wireless communication board 123.

In a case where the GND potential of the wireless communication board 123 is sufficiently stabilized, electrical connection to the attachment portion 401 of the controller box 302 is unnecessary, and screw fastening is unnecessary, the attachment hole 204 and the copper foil exposed portion 205 may be covered with the magnetic sheet 500.

In a case where the communication circuit (wireless communication driver circuit 202) on the back surface 123b of the wireless communication board 123 is exposed, the magnetic sheet is not attached to a region overlapping with the exposed portion of the communication circuit. The region is a portion where an electrode of the wireless communication driver circuit 202 is exposed on the back surface 123b of the wireless communication board 123. It is desirable that a gap between a region overlapping with the wireless communication driver circuit 202 and an edge of the magnetic sheet 500 that is adjacent to the wireless communication driver circuit 202 is a predetermined gap t1 (for example, 5 mm), so that the edge of the magnetic sheet 500 does not come into contact with the portion (region). The reason is that the magnetic layer 502 serving as the conductor is exposed at the edge of the magnetic sheet 500, and there is a risk of short-circuiting with the exposed electrode of the wireless communication driver circuit 202. In order to implement such a configuration, it is desirable that a gap between the region overlapping with the wireless communication antenna 201 and the region overlapping with the wireless communication driver circuit 202 (the portion where the electrode is exposed) is a predetermined gap t2 (for example, 10 mm) on the back surface 123b of the wireless communication board 123. As a result, there can be a gap between the magnetic sheet 500 covering the region overlapping with the wireless communication antenna 201 and the exposed electrode of the wireless communication driver circuit 202 on the back surface 123b of the wireless communication board 123. That is, it is desirable that the magnetic sheet 500 is attached to the back surface 123b of the wireless communication board 123 in such a way that the edge of the magnetic sheet 500 is spaced apart, with the predetermined gap t1, from the region overlapping with the wireless communication driver circuit 202. In other words, the magnetic sheet 500 may be attached to a part of the wireless communication driver circuit 202 in such a way as not to overlap with the portion where the wireless communication driver circuit 202 is exposed on the back surface 123b of the wireless communication board 123.

The present invention is not limited to the configuration in which the magnetic sheet 500 is attached to the back surface 123b of the wireless communication board 123 in such a way that the edge of the magnetic sheet 500 is spaced apart, with the predetermined gap t1, from the region overlapping with the wireless communication driver circuit 202.

For example, the magnetic sheet 500 may be attached to a region other than the region overlapping with the wireless communication driver circuit 202 on the back surface 123b of the wireless communication board 123.

Alternatively, the magnetic sheet 500 may be attached to the back surface 123b of the wireless communication board 123 in such a way as to entirely cover the region overlapping with the wireless communication driver circuit 202. In the configuration in which the magnetic sheet 500 is attached to the back surface 123b of the wireless communication board 123 in such a way as to entirely cover the region overlapping with the wireless communication driver circuit 202, a gap between the wireless communication antenna 201 and the exposed electrode of the wireless communication driver circuit 202 is unnecessary.

As described above, other configurations may be adopted as long as a short circuit between the edge (conductor portion) of the magnetic sheet 500 and the exposed electrode of the wireless communication driver circuit 202 is prevented.

As described above, according to the present embodiment, the magnetic sheet 500 is attached to at least the region overlapping with the wireless communication antenna 201 on the back surface 123b of the wireless communication board 123, and it is thus possible to suppress interference waves from being incident on the wireless communication board 123 at low cost.

In FIG. 4B, the configuration in which the wireless communication board 123 having only a wireless communication capability based on a wireless LAN is attached to the controller box 302 on the back surface of the image forming apparatus S has been described as an example. In a case where the wireless communication board 123 has a wireless communication capability other than the capability based on a wireless LAN, a position where the wireless communication board 123 is attached is not limited to the back surface of the image forming apparatus S.

When the image forming apparatus S performs wireless communication with an external terminal, a standard for performing wireless communication with a distance of several centimeters such as NFC or a standard for performing wireless communication with a distance of several meters such as Bluetooth may be used in combination with a standard according to IEEE 802.11 capable of performing wireless communication even with a distance of several tens of meters. Here, NFC or the like is a communication scheme that can prevent interception of communication by a third party due to a characteristic that communication can be performed only with a distance of up to several centimeters and has high security capability. In addition, since Bluetooth is a communication scheme for performing communication while pairing transmission/reception devices on a one-to-one basis and performing encryption, it is possible to prevent communication interception by a third party, and thus, the communication scheme has high security capability. As an example of using the plurality of wireless communication schemes in combination, there is a method in which communication setting information such as ID information for performing communication via a wireless LAN using NFC or Bluetooth is transmitted and received between the image forming apparatus S and an external terminal, and communication is performed via the wireless LAN based on the information. By using this method, it is possible to avoid a security risk that initial setting information is intercepted by a third party while reducing the time and effort for the user to perform initial setting of the wireless LAN, and it is possible to improve convenience of the user.

In order to perform a service using the plurality of wireless communication standards as described above, it is necessary to mount a wireless communication device corresponding to each wireless communication standard in the image forming apparatus S. However, in a case where a plurality of wireless communication devices is mounted on the image forming apparatus S, the number of components increases, and the manufacturing cost of the image forming apparatus S increases. As a method of suppressing an increase in manufacturing cost, for example, the wireless communication board 123 may have two wireless communication capabilities including the wireless communication capability based on a wireless LAN and a wireless communication capability based on the Bluetooth standard.

In a case of performing wireless communication using the Bluetooth standard, the wireless communication board 123 is desirably disposed on the front surface of the image forming apparatus S. When the wireless communication board 123 is disposed on the back surface of the image forming apparatus S, the frame, which is the metal housing of the image forming apparatus S, is likely to overlap on the line connecting the external terminal and the wireless communication board 123, and thus, an apparent communication distance becomes larger than the actual communication distance. The increase in apparent communication distance has a small influence in wireless communication having a communication range of several tens of meters such as the wireless LAN standard, but has a large influence in wireless communication having only a communication range of several meters such as Bluetooth, and narrows the actual effective communication range. As a result, there is a high possibility of causing inconvenience such that wireless communication using the Bluetooth standard cannot be performed even when the user stands at a normal operation position such as a position in front of the image forming apparatus S.

Therefore, in order to fully perform wireless communication using the Bluetooth standard, it is desirable to arrange the wireless communication board 123 on the front surface of the image forming apparatus S as illustrated in FIG. 8. FIG. 8 is a schematic view illustrating arrangement in a case where the wireless communication board 123 is disposed on the front surface of the image forming apparatus S.

Specifically, the wireless communication board 123 is attached to the metal columnar support 304 for attaching the operation portion 110 on the front surface of the image forming apparatus S. Here, the metal columnar support 304 is included in the frame (metal housing) 300 that supports the printer 114 serving as the image forming unit, and the GND potential is the same as that of the frame. The metal columnar support 304 is a support member that supports the operation portion 110 on a side opposite to the controller box 302 via the printer 114. The wireless communication board 123 is supported by the metal columnar support 304 that supports the operation portion 110. The shape and arrangement position of the frame (metal housing) 300 for attaching the wireless communication board 123 on the front surface of the image forming apparatus S are not limited to the metal columnar support 304. For example, the wireless communication board 123 may be attached to the front surface of a metal housing of the scanner 116.

As illustrated in FIG. 8, in a case where the wireless communication board 123 is attached to the metal columnar support 304 that supports the operation portion 110, the wireless communication board 123 is connected to the controller 100 in the controller box 302 attached to the rear plate 301 on the back surface side of the image forming apparatus S by the communication cable 303. The communication cable 303 connected to the controller 100 is connected to the wireless communication board 123 on the front side through the inside of the image forming apparatus S. Alternatively, the communication cable 303 connected to the controller 100 is connected to the wireless communication board 123 on the front side through the inside of the frame (for example, the inside of the stay between the rear plate and the front plate included in the frame).

Even in such a configuration, the magnetic sheet 500 is attached to at least the region overlapping with the wireless communication antenna 201 on the back surface 123b of the wireless communication board 123, and it is thus possible to suppress interference waves from being incident on the wireless communication board 123 at low cost.

In the above-described embodiment, the configuration in which the controller box 302 serving as the support member includes the attachment portion 401 has been exemplified, but the present invention is not limited thereto. In the controller box 302, in addition to the attachment portion 401 serving as a first attachment portion, a second attachment portion (not illustrated) may be provided at a position different from the first attachment portion.

In this case, in addition to the attachment hole 204 which is a first hole, a positioning hole (not illustrated) which is a second hole is also provided in the wireless communication board 123 at a position different from the first hole. In addition, the second attachment portion has a protrusion (not illustrated) that penetrates the positioning hole that is the second hole of the wireless communication board 123 and positions the wireless communication board 123 on the controller box 302. Then, the protrusion of the second attachment portion penetrates through the positioning hole that is the second hole provided at a position different from the attachment hole 204 that is the first hole of the wireless communication board 123 to position the wireless communication board 123 on the controller box 302. With such a configuration, assemblability is improved.

Further, in the above-described embodiment, a scanning exposure unit (laser scanner unit) that performs scanning exposure by rotating a rotating polygon mirror is used as the exposure portion, but the exposure portion is not limited thereto. For example, an exposure head in which light emitting elements such as an LED and an organic EL are arranged substantially linearly in a direction (main scanning direction) parallel to a rotation axis of the photosensitive drum may be used as the exposure portion.

Further, in the above-described embodiment, the printer has been described as an example of the image forming apparatus, but the present invention is not limited thereto. For example, another image forming apparatus such as a copying machine or a facsimile machine, or another image forming apparatus such as a multifunction peripheral in which these functions are combined may be used. In addition, the image forming apparatus has been exemplified in which the intermediate transfer member is used, toner images of respective colors are transferred to the intermediate transfer member in a sequentially superimposed manner, and the toner images carried on the intermediate transfer member are collectively transferred to the recording material, but the present invention is not limited thereto. The image forming apparatus may be an image forming apparatus that uses a recording material carrier and transfers toner images of respective colors in a sequentially superimposed manner on the recording material carried on the recording material carrier. Similar effects can be obtained by applying the present invention to these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111681, filed Jul. 12, 2022, which is hereby incorporated by reference herein in its entirety.

What is claimed is:

1. An image forming apparatus comprising:
a wireless communication board on which a communication circuit that wirelessly communicates image data with an external device is mounted, wherein the wireless communication board has a first surface to which a magnetic sheet including a magnetic layer containing metal powder is attached, includes an antenna that is provided on a second surface opposite to the first surface of the wireless communication board and is used for wireless communication by the communication circuit, and a region of the magnetic sheet on the first surface and a region of the antenna on the second surface overlap with each other in a thickness direction of the wireless communication board;
an image forming unit configured to form an image based on the image data;

a control board connected to the wireless communication board via a connection line and configured to control an image forming operation performed by the image forming unit; and a metal support member configured to support the control board, the metal support member having a metal surface that faces the first surface of the wireless communication board.

2. The image forming apparatus according to claim 1, wherein the wireless communication board has an attachment hole for attaching the wireless communication board to the support member by screw fastening, and a conductive portion provided on the first surface of the wireless communication board and electrically connected to the support member by contacting the support member, and wherein the magnetic sheet is attached to a region other than a region overlapping with the attachment hole and the conductive portion on the first surface of the wireless communication board.

3. The image forming apparatus according to claim 1, wherein the magnetic sheet is attached to a region other than a region overlapping with the communication circuit on the first surface of the wireless communication board.

4. The image forming apparatus according to claim 3, wherein an edge of the magnetic sheet is attached to the first surface of the wireless communication board while being spaced apart, with a predetermined gap, from the region overlapping with the communication circuit.

5. The image forming apparatus according to claim 1, wherein the magnetic sheet is attached to the first surface of the wireless communication board in such a way as to entirely cover the region overlapping with the communication circuit.

6. The image forming apparatus according to claim 1, wherein the wireless communication board has a conductive portion provided on the first surface of the wireless communication board and electrically connected to the support member by contacting the support member, and wherein the magnetic sheet is overlappingly attached to a part of the communication circuit in such a way as not to overlap with the conductive portion on the first surface of the wireless communication board.

7. The image forming apparatus according to claim 1, wherein the magnetic sheet is overlappingly attached to a part of the communication circuit in such a way as not to overlap with a portion where the communication circuit is exposed on the first surface of the wireless communication board.

8. The image forming apparatus according to claim 1, wherein the wireless communication board includes a connector for connecting the connection line, and the connector is disposed on the second surface of the wireless communication board.

9. The image forming apparatus according to claim 1, wherein the magnetic sheet includes, in addition to the magnetic layer, a protective layer that protects the magnetic layer, and an adhesive layer for attaching the magnetic sheet.

10. The image forming apparatus according to claim 1, further comprising a frame including a plurality of sheet metals and configured to support the image forming unit, wherein the support member is a metal box that is supported by the frame and accommodates the control board.

11. The image forming apparatus according to claim 1, further comprising a frame including a plurality of sheet metals and configured to support the image forming unit, wherein the support member is the frame, and the wireless communication board is supported by the frame.

12. The image forming apparatus according to claim 11, further comprising:

a metal box supported by the frame and configured to accommodate the control board; and a reception unit supported by the frame on a side opposite to the box via the image forming unit and configured to receive user instruction information, wherein the support member is the frame that supports the reception unit on the side opposite to the box, and the wireless communication board is supported by the frame that supports the reception unit.

13. The image forming apparatus according to claim 1, wherein the communication circuit is configured to perform wireless communication according to a standard compliant with IEEE 802.11.

* * * * *